US010977953B2

(12) United States Patent
Laine et al.

(10) Patent No.: US 10,977,953 B2
(45) Date of Patent: Apr. 13, 2021

(54) PROBABILISTIC LANDMARK NAVIGATION (PLN) SYSTEM

(71) Applicant: The Charles Stark Draper Laboratory, Inc., Cambridge, MA (US)

(72) Inventors: Juha-Pekka J. Laine, Boston, MA (US); Simone B. Bortolami, Belmont, MA (US); Joseph M. Kinast, Arlington, MA (US); Charles F. Arant, Wesley Chapel, FL (US); Stephen P. Smith, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 495 days.

(21) Appl. No.: 15/897,311

(22) Filed: Feb. 15, 2018

(65) Prior Publication Data

US 2018/0240349 A1 Aug. 23, 2018

Related U.S. Application Data

(60) Provisional application No. 62/460,153, filed on Feb. 17, 2017.

(51) Int. Cl.
*G08G 5/00* (2006.01)
*G06K 9/00* (2006.01)
(Continued)

(52) U.S. Cl.
CPC ........... *G08G 5/0047* (2013.01); *G01C 11/06* (2013.01); *G01C 21/30* (2013.01); *G06K 9/0063* (2013.01); *G06K 9/6202* (2013.01); *G08G 5/0086* (2013.01)

(58) Field of Classification Search
CPC .... G08G 5/0047; G08G 5/0086; G01C 11/06; G01C 21/30; G06K 9/0063; G06K 9/6202
(Continued)

(56) References Cited

U.S. PATENT DOCUMENTS 3,580,978 A * 5/1971 Ebeling .................... G09B 9/32
434/43
4,179,693 A * 12/1979 Evans ........................ G01S 7/04
342/64

(Continued)

FOREIGN PATENT DOCUMENTS

EP 1677076 B1 * 2/2017 ............. F41G 7/343

OTHER PUBLICATIONS

IP.com Search, Dec. 22, 2020.*
(Continued)

*Primary Examiner* — Mahmoud S Ismail
(74) *Attorney, Agent, or Firm* — Sunstein LLP

(57) ABSTRACT

A probabilistic landmark navigation system is arranged to obtain from one or more image sensors one or more terrain images of a target terrain to be traversed by a vehicle. The terrain images are characterized by multiple individually non-distinctive terrain features without distinctively identifiable landmark features. The non-distinctive terrain features in the one or more terrain images are compared to map database information to make a non-temporal probabilistic determination of absolute location coordinates to associate with the non-distinctive terrain features. Then a navigation path is determined for the vehicle across the target terrain based on the absolute location coordinates.

24 Claims, 5 Drawing Sheets

(51) Int. Cl.
  *G06K 9/62* (2006.01)
  *G01C 21/30* (2006.01)
  *G01C 11/06* (2006.01)
  *G01S 13/00* (2006.01)
(58) Field of Classification Search
  USPC .......................................... 701/430; 342/64
  See application file for complete search history.

(56) References Cited

U.S. PATENT DOCUMENTS

| | | | | |
|---|---|---|---|---|
| 2006/0158520 | A1* | 7/2006 | Funakura | H04N 5/23203 |
| | | | | 348/207.99 |
| 2008/0195315 | A1* | 8/2008 | Hu | G01C 21/3647 |
| | | | | 701/455 |
| 2009/0234574 | A1 | 9/2009 | Deng et al. | |
| 2010/0201829 | A1* | 8/2010 | Skoskiewicz | G08G 1/04 |
| | | | | 348/211.2 |
| 2017/0328716 | A1* | 11/2017 | Ma | G06K 9/6269 |
| 2018/0245922 | A1* | 8/2018 | Zaphir | G01C 21/3461 |
| 2020/0012829 | A1* | 1/2020 | Davidson | G06K 19/06168 |

OTHER PUBLICATIONS

Rodrigues, J.J. et al., "Matching Aerial Images to 3-D Terrain Maps", IEEE Transactions on Pattern Analysis and Machine Intelligence, IEE Computer Society, NY, vol. 12, No. 12, Dec. 12, 1990, pp. 1138-1149.

Talluri, Raj et al., "Position Estimation for an Autonomous Mobile Robot in an Outdoor Environment", IEEE Transactions on Robotics and Automation, IEEE, Inc., NY, vol. 8, No. 5, Oct. 5, 1992, pp. 573-575.

European Patent Office, International Search Report and Written Opinion for PCT Application No. PCT/US18/18283, dated May 14, 2018, 18 pages.

* cited by examiner

PROBABILISTIC LANDMARK NAVIGATION (PLN) SYSTEM

This application claims priority from U.S. Provisional Patent Application 62/460,153, filed Feb. 17, 2017, which is incorporated herein by reference in its entirety.

TECHNICAL FIELD

The present invention relates to image-based navigation systems using non-distinctive terrain features.

BACKGROUND ART

Current landmark-based navigation arrangements conduct navigational sightings using one or more imaging devices (e.g., a camera, radar, or other imaging sensors), as shown in FIG. 1A, looking only at distinctive and easily identifiable major landmarks such as buildings, crossroads, airport runways, etc. For example, navigational images may be taken from a vehicle at altitude looking down at a target terrain to be traversed by the vehicle to produce two-dimensional imagery of distinctive landmarks and ground features. The distinctive landmark features in the navigational images are then compared (in an automated system) to existing limited size imagery map data that characterize the same distinctive landmark features, and obtain a relatively easy high-confidence navigational solution for the imager position and orientation. As shown in FIG. 1B, the reliance on distinctive landmark features results in relatively few image matches for a given distance traveled.

However, for operations in areas with featureless terrain or no distinctive landmarks—such as when flying over a jungle canopy, over desert, over ice, etc., or similarly for that matter, moving on the ground in a desert or inside a jungle, on foot or in a vehicle, the existing image matching approach using distinctive landmark features alone is not sufficient. Another example is moving, hovering and the like at low altitude where the field of view of an imaging camera may not be great enough to cover at least one recognizable landmark feature at any given time. These challenging navigational situations with few if any distinctive landmarks or ground features available for navigational image matching may result in unreliable navigation performance over time, or in the worst case, an outright inability to navigate at all.

SUMMARY

Embodiments of the present invention are directed to arrangements for a probabilistic landmark navigation (PLN) system that obtains from one or more image sensors one or more terrain images of a target terrain to be traversed by a vehicle from the air or on the ground. The terrain images are characterized by multiple individually non-distinctive terrain features without distinctively identifiable landmark features. The non-distinctive terrain features in the one or more terrain images are compared to map database information to make a non-temporal probabilistic determination of absolute location coordinates to associate with the non-distinctive terrain features. Then a navigation path is determined for the vehicle across the target terrain based on the absolute location coordinates.

In further specific embodiments, the navigation path may be dynamically determined in real time as the vehicle traverses the target terrain, or pre-determined before the vehicle traverses the target terrain. And the one or more terrain images may include multiple terrain images of the target terrain.

Determining the navigation path may be further based on additional navigational information in addition to the absolute location coordinates. For example, additional navigational information may be used when the non-temporal probabilistic determination of absolute location coordinates is further associated with a low reliability confidence, and or the additional navigational information may include information characterizing distinctively identifiable landmark features not present in the one or more terrain images. Or the additional navigational information may include information characterizing density of distinctively identifiable landmark features present along the navigation path so as to favor directing the navigation path through greater density so as to improve to improve navigational reliability. The vehicle or the observing system can be also stationary and the "navigation path" replaced by an image-scanning path. The system might have the use of identifying a location within an absolute context or a relative context.

DETAILED DESCRIPTION

Figure 1A:
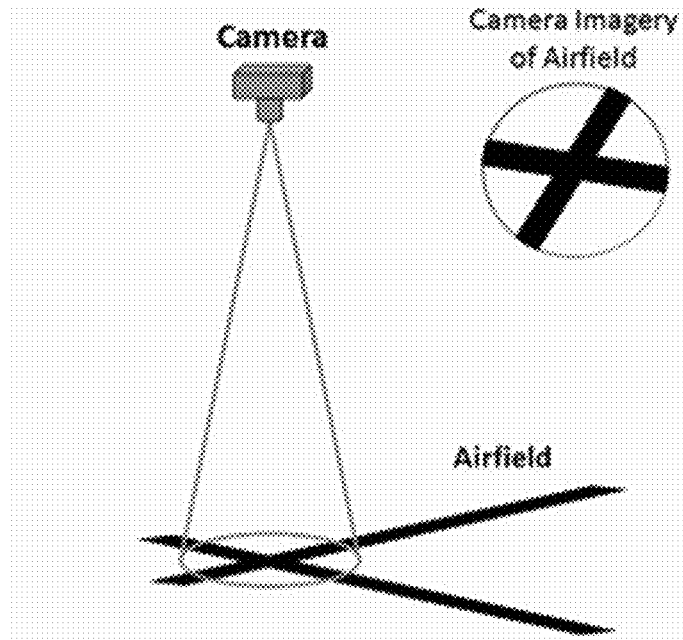
FIGS. 1A-1B illustrate the principle of existing landmark-based navigation systems based on identification of major distinctive landmark features.
Figure 1B:
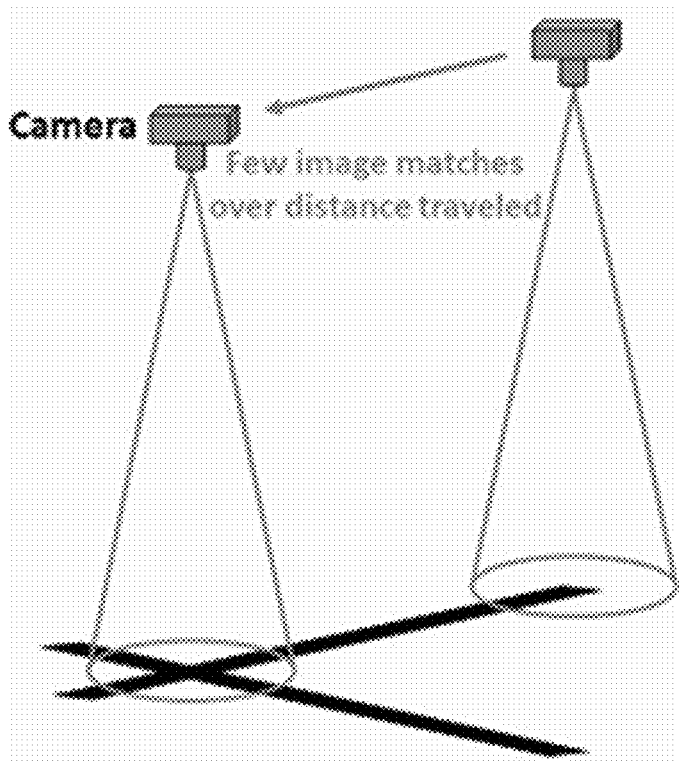
Figure 2A:
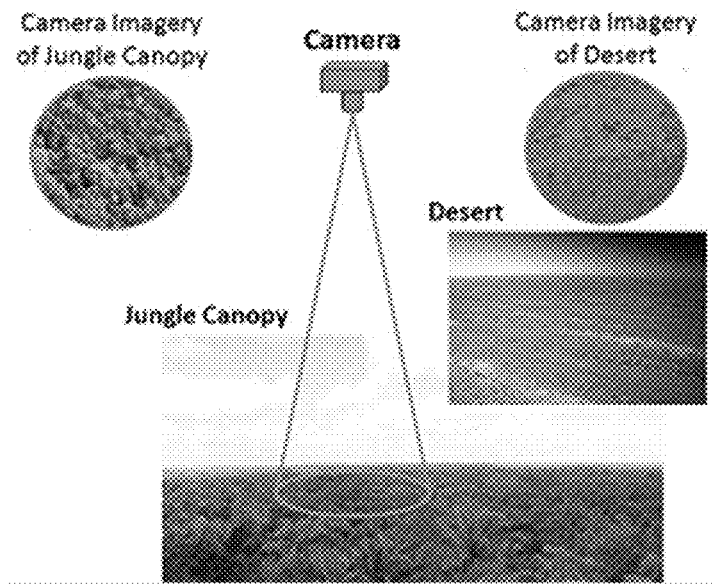
FIGS. 2A-2B illustrate the principle of a probabilistic landmark navigation system according to an embodiment of the present invention.
Figure 2B:
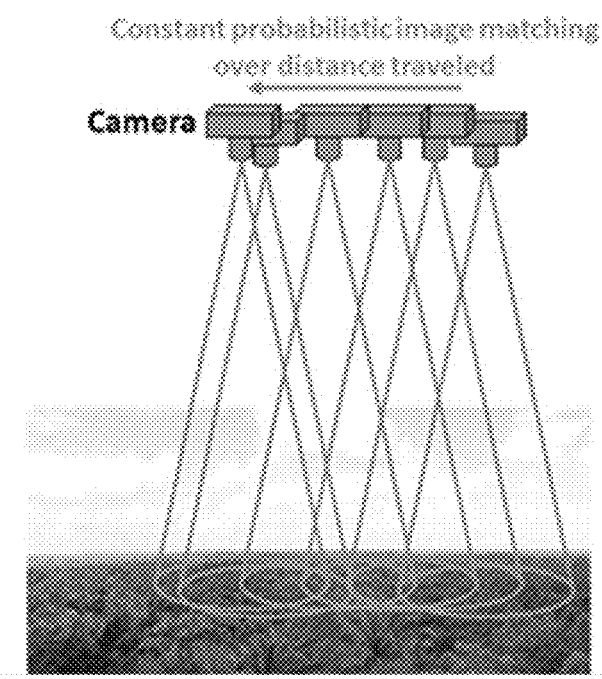

Various embodiments of the present invention are directed to a novel landmark navigation concept for vehicles at any altitude traversing or observing over target terrains with or without distinctive landmark features. For example, FIG. 2A illustrates taking navigational imagery with an imaging camera while traveling over a featureless terrain such as jungle or desert. Multiple individually unremarkable non-distinctive terrain features in one or more terrain images are considered together using probabilistic matching techniques to generate a statistically meaningful set of navigational features from which to generate an absolute position solution. For example, FIG. 2B shows constant probabilistic image matching being performed while an imaging camera traverses over a featureless jungle canopy. Absolute image-based position solutions can be generated—even when distinctive landmark matching does not work—while operating over almost featureless terrain.

Figure 3:
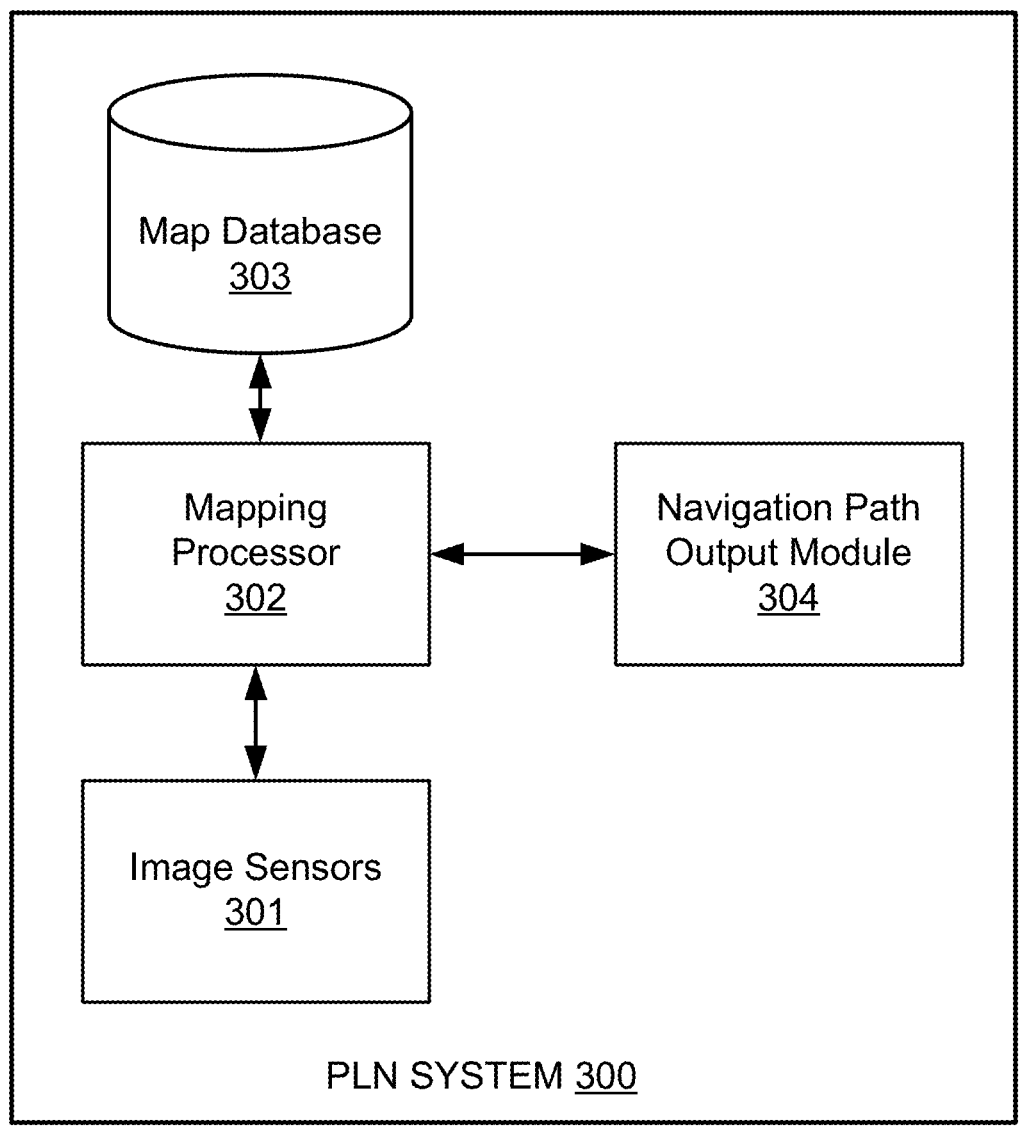
FIG. 3 show basic functional blocks in a probabilistic landmark navigation system according to an embodiment of the present invention.
Figure 4:
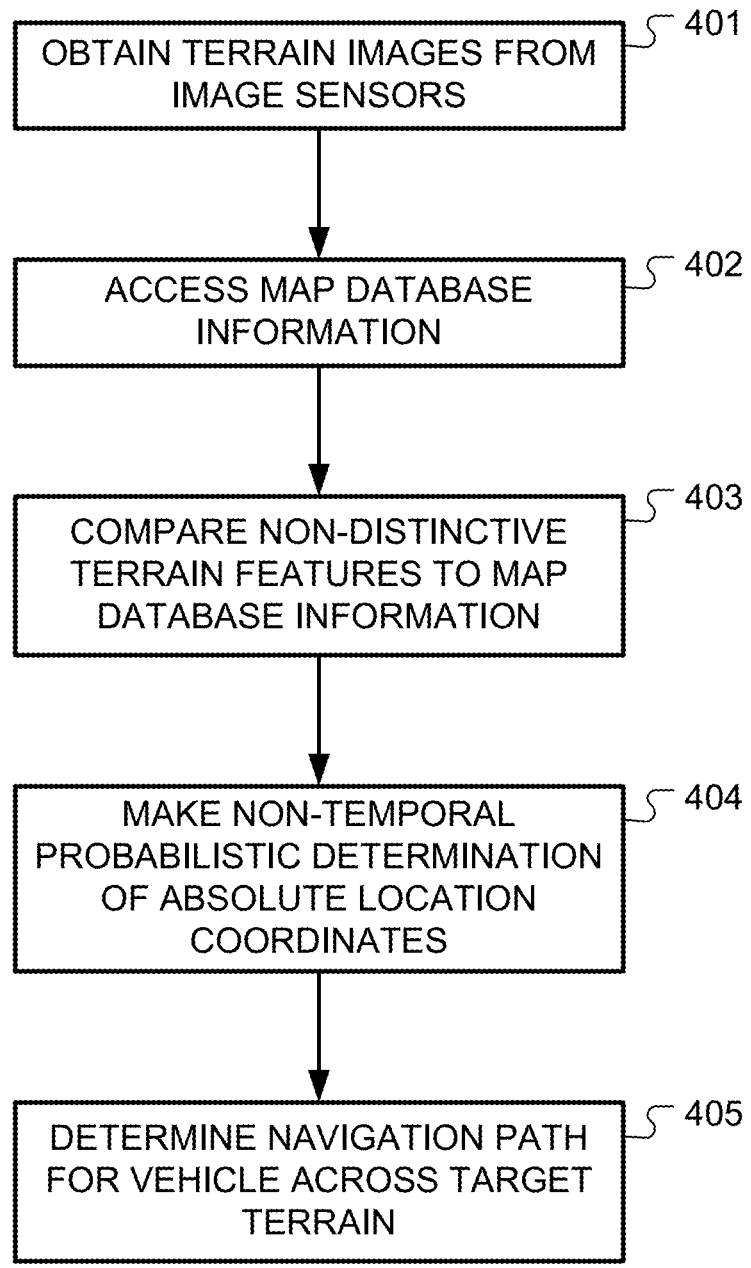
FIG. 4 shows various logical steps in a method of probabilistic landmark navigation according to an embodiment of the present invention.
Figure 5:
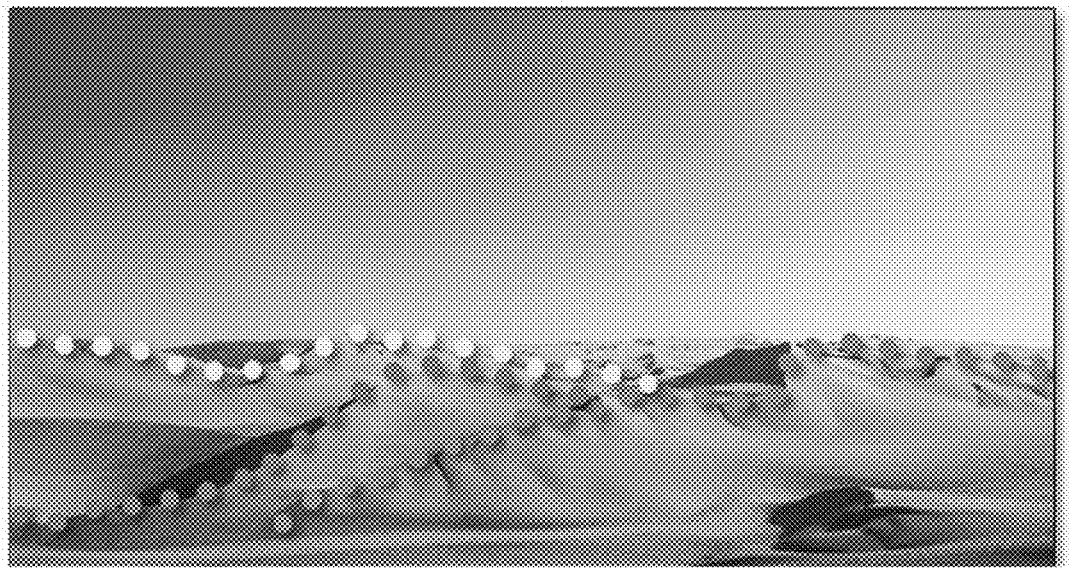
FIG. 5 is an annotated landscape image illustrating how multiple non-distinctive terrain features in an image can be considered together.

FIG. 3 show basic functional blocks in a probabilistic landmark navigation system and FIG. 4 shows various logical steps in a method of probabilistic landmark navigation according to embodiments of the present invention. A probabilistic landmark navigation (PLN) system 300 has a mapping processor 302 that includes at least one hardware implanted processor device which is controlled by software instructions to perform the probabilistic landmark navigation process including instructing one or more image sensors 301—for example, one or more imaging cameras, radar imagers, or other imaging devices—to obtain one more terrain images of a target terrain to be traversed by a vehicle, step 401. The one or more terrain images are characterized by multiple individually non-distinctive terrain features without distinctively identifiable landmark features such as can be obtained by travel over a featureless target terrain such as jungle, desert, ice, etc., there may typically be multiple terrain images of the target terrain; for example, from continuous imaging of the terrain. FIG. 5 shows an example of how ridge lines in one or more images of sand dunes form arrangements of multiple individually non-distinctive terrain features without distinctively identifiable landmark features.

The mapping processor 302 also executes instructions to access map database information stored in a map database 302, step 402, which is a very large map database and/or a heavily-abstracted map database. The mapping processor 302 then executes instructions to compare the non-distinctive terrain features in the one or more terrain images to the information in the map database 303, step 403, to make a non-temporal probabilistic determination of absolute location coordinates to associate with the non-distinctive terrain features, step 404. Specific individual terrain images do not need to have distinctive landmark features present in them because the multiple non-distinctive terrain features in the one or more terrain images—features that are not sufficient on their own for conventional landmark recognition—are sufficient when combined together with multiple other minor terrain features, which may be from prior (and/or future) images in a sequence of terrain images over time. So, for example with respect to the sand dunes in FIG. 5, a single feature on a ridge of a sand dune might not be enough on its own to determine absolute position coordinates, but a sequence of them can allow recognition of the whole ridge from a stored mensurated image-map database 302 and so to geo-locate the ridge and a specific position on it.

Then the mapping processor 302 executes further instructions to determine a navigation path for the vehicle across the target terrain based on the absolute location coordinates, step 405. In specific applications, the PLN system 300 may be used to dynamically determine the navigation path in real time as the vehicle traverses the target terrain, and/or it may be arranged to pre-determine the navigation path before the vehicle traverses the target terrain. The mapping processor 302 also may further execute instructions to provide the navigation path via a navigation path output module 304 for use by higher level system components and/or other systems.

Figure 6:
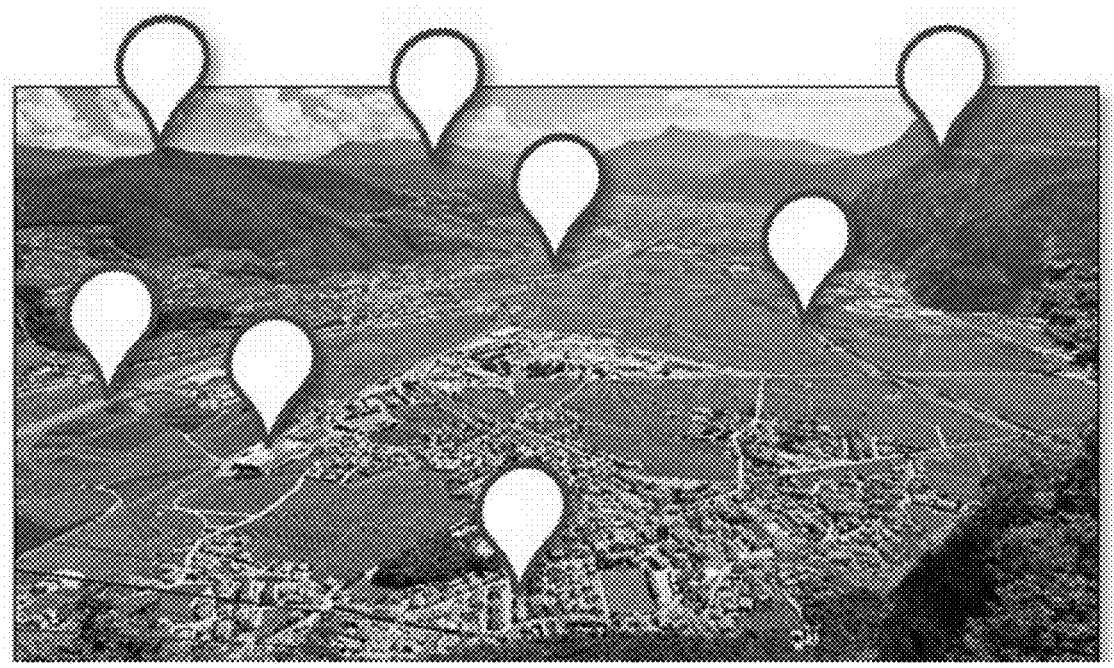
FIG. 6 is an annotated landscape image illustrating how probabilistic landmark navigation features can be used in combination in images containing conventional distinctive landmark features.

In some embodiments, the mapping processor 302 may use additional navigational information to determine the navigational path in addition to the absolute location coordinates; for example, when the non-temporal probabilistic determination of absolute location coordinates is associated with a low reliability confidence, the mapping processor 302 may direct the navigation path along "safer" headings toward areas with more terrain features or distinctive landmarks to improve the navigational reliability and or the additional navigational information may include information characterizing distinctively identifiable landmark features not present in the one or more terrain images. In addition, the mapping processor 302 also may be arranged to use probabilistic matching of multiple individually non-distinctive terrain features without distinctively identifiable landmark features together with conventional navigation using distinctive landmark features. FIG. 6 shows an example of one or more terrain images of a target terrain to be traversed which includes both kinds of navigational features.

Operationally, the PLN can be used in an automated mission planning system (pre-mission and/or real-time) that takes into account multiple mission planning factors including the available map-database imagery and the performance of the onboard imaging sensors, in order to determine an estimated number of terrain images needed in a sequence to achieve an unambiguous and accurate navigation solution during various phases of the mission.

The PLN concept is different from vision-based odometry, which exploits relative rate information and/or measurements within the vehicle's reference frame to aid the onboard inertial sensors. In all cases, odometry limits the rate of growth of the position and/or attitude errors. PLN, however, by relying on position fixes that are planned and sought for both at the pre-planning stage and during real-time navigation, limits the position and/or angular errors directly. PLN can be used in conjunction with odometry if so desired.

Embodiments of the invention may be implemented in whole or in part in any conventional computer programming language such as, but not limited to, VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A probabilistic landmark navigation system comprising:
   at least one hardware processor; and
   at least one hardware memory device operatively connected to the at least one hardware processor;
   wherein the at least one hardware processor is configured to execute program instructions to:
      obtain from one or more image sensors one or more terrain images of a target terrain to be traversed by a vehicle, wherein the one or more terrain images are characterized by a plurality of individually non-distinctive terrain features without distinctively identifiable landmark features;
      access map database information stored in the at least one hardware memory device;
      compare the plurality of non-distinctive terrain features in the one or more terrain images to the map database information to make a non-temporal probabilistic determination of absolute location coordinates to associate with the plurality of non-distinctive terrain features; and
      determine a navigation path for the vehicle across the target terrain based on the absolute location coordinates.

2. The system according to claim 1, wherein the at least one hardware processor is configured to execute the program instructions as the vehicle traverses the target terrain to dynamically determine the navigation path in real time.

3. The system according to claim 1, wherein the at least one hardware processor is configured to execute the program instructions before the vehicle traverses the target terrain to pre-determine the navigation path.

4. The system according to claim 1, wherein the one or more terrain images include a plurality of terrain images of the target terrain.

5. The system according to claim 1, wherein determining the navigation path is further based on additional navigational information in addition to the absolute location coordinates.

6. The system according to claim 5, wherein the additional navigational information is used when the non-temporal probabilistic determination of absolute location coordinates is further associated with a low reliability confidence.

7. The system according to claim 5, wherein the additional navigational information includes information characterizing distinctively identifiable landmark features not present in the one or more terrain images.

8. The system according to claim 5, wherein the additional navigational information includes information characterizing density of distinctively identifiable landmark features present along the navigation path so as to favor directing the navigation path through greater density so as to improve navigational reliability.

9. A computer-implemented method employing at least one hardware implemented computer processor for probabilistic landmark navigation, the method comprising:
   operating the at least one hardware processor to execute program instructions to:
      obtain from one or more image sensors one or more terrain images of a target terrain to be traversed by a vehicle, wherein the one or more terrain images are characterized by a plurality of individually non-distinctive terrain features without distinctively identifiable landmark features;
      access map database information stored in at least one hardware memory device;
      compare the plurality of non-distinctive terrain features in the one or more terrain images to the map database information to make a non-temporal probabilistic determination of absolute location coordinates to associate with the plurality of non-distinctive terrain features; and
      determine a navigation path for the vehicle across the target terrain based on the absolute location coordinates.

10. The method according to claim 9, wherein the navigation path is dynamically determined in real time as the vehicle traverses the target terrain.

11. The method according to claim 9, wherein the navigation path is pre-determined before the vehicle traverses the target terrain.

12. The method according to claim 9, wherein the one or more terrain images include a plurality of terrain images of the target terrain.

13. The method according to claim 9, wherein determining the navigation path is further based on additional navigational information in addition to the absolute location coordinates.

14. The method according to claim 13, wherein the additional navigational information is used when the non-temporal probabilistic determination of absolute location coordinates is further associated with a low reliability confidence.

15. The method according to claim 13, wherein the additional navigational information includes information characterizing distinctively identifiable landmark features not present in the one or more terrain images.

16. The method according to claim 13, wherein the additional navigational information includes information characterizing density of distinctively identifiable landmark features present along the navigation path so as to favor directing the navigation path through greater density so as to improve navigational reliability.

17. A computer program product encoded in a non-transitory computer-readable medium, which when executed by a computer causes the computer to perform the following operations:
   obtain from one or more image sensors one or more terrain images of a target terrain to be traversed by a vehicle, wherein the one or more terrain images are characterized by a plurality of individually non-distinctive terrain features without distinctively identifiable landmark features;
   access map database information stored in at least one hardware memory device;
   compare the plurality of non-distinctive terrain features in the one or more terrain images to the map database information to make a non-temporal probabilistic determination of absolute location coordinates to associate with the plurality of non-distinctive terrain features; and
   determine a navigation path for the vehicle across the target terrain based on the absolute location coordinates.

18. The computer program product according to claim 17, wherein the navigation path is dynamically determined in real time as the vehicle traverses the target terrain.

19. The computer program product according to claim 17, wherein the navigation path is pre-determined before the vehicle traverses the target terrain.

20. The computer program product according to claim 17, wherein the one or more terrain images include a plurality of terrain images of the target terrain.

21. The computer program product according to claim 17, wherein determining the navigation path is further based on additional navigational information in addition to the absolute location coordinates.

22. The computer program product according to claim 19, wherein the additional navigational information is used when the non-temporal probabilistic determination of absolute location coordinates is further associated with a low reliability confidence.

23. The computer program product according to claim 19, wherein the additional navigational information includes information characterizing distinctively identifiable landmark features not present in the one or more terrain images.

24. The computer program product according to claim 19, wherein the additional navigational information includes information characterizing density of distinctively identifiable landmark features present along the navigation path so as to favor directing the navigation path through greater density so as to improve navigational reliability.

* * * * *